BINARY TO DECIMAL CONVERSION METHOD AND APPARATUS

Filed Nov. 25, 1964 2 Sheets-Sheet 1

INVENTOR.
HOWARD M. RATHBUN
MARK PIVOVONSKY
BY
Charles L. Johnson Jr.
ATTORNEY

BINARY TO DECIMAL CONVERSION METHOD AND APPARATUS

Filed Nov. 25, 1964 2 Sheets-Sheet 2

INVENTOR.
HOWARD M. RATHBUN
MARK PIVOVONSKY
BY
Charles L. Johnson Jr.
ATTORNEY

United States Patent Office 3,373,269

Patented Mar. 12, 1968

3,373,269
BINARY TO DECIMAL CONVERSION METHOD AND APPARATUS

Howard M. Rathbun, Smithtown, and Mark Pivovonsky, New York, N.Y., assignors to Litton Business Systems, Inc., a corporation of Delaware Filed Nov. 25, 1964, Ser. No. 413,864
8 Claims. (Cl. 235—155)

ABSTRACT OF THE DISCLOSURE

The invention is directed to a radix conversion device for converting a number of binary notation to a number in a coded decimal notation. The conversion technique employs the repeated division of a number in binary notation by 10 until the number goes to zero or a number of times equal to the number decimal digits that could be contained in the binary number to be converted. The number of divisions by 10 is counted and the result of the divisions is multiplied by 10 the same number of times. The result is in the proper coded notation. Variations of the basic structural configuration permit the coded decimal result to take the form of 8421, 5211, and 4221.

This invention relates generally to computer systems and more especially to systems for converting number representations from a binary representation to an equivalent coded decimal representation.

Therefore a principal object of the invention is to provide a more efficient method and apparatus for converting binary numbers into corresponding coded decimal numbers.

One of the difficulties encountered in computers in which numbers are expressed in the binary number system is that of converting the representations from binary to decimal. One known method involves the repeated subtraction of a power of 10 from the binary number until the binary number is less than the power of 10 and to count the number of subtractions. The resultant count is a decimal digit representing the highest order decimal digit of the binary number. This digit can then be transmitted to any suitable output device or to any desired section of the computer. The next lower order digit is obtained by repeating the subtraction process with the next lower power of 10 and so on until the lowest order digit is obtained. This prior method therefore requires the storage or generation of all the successive powers of 10 and takes an average of five word times for each converted digit and may require as many as nine word times for each digit.

In accordance with this invention it is possible to achieve the conversion from binary to decimal code without requiring the storage or generation of any powers of 10 and requiring only five word times for each converted digit. This result was obtained by using only two registers which are used in conjunction with each other to effect successive divisions by 10 and successive multiplications by 10. The number of such divisions and the number of such multiplications being equal and in any event not less than the number of decimal digits in the converted number. Each division by 10 requires four word time delays and each multiplication by 10 requires one word time delay. Thus, for each converted digit only five word times are required as compared with an average of five and a maximum of nine word times required with a prior known conversion arrangement.

Accordingly one of the principle objects of the invention is to provide a novel combination of dividing and multiplying arrangements whereby a conversion can be effected from a binary number to its coded decimal equivalent in a minimum number of word times.

Still another object of the invention is to provide a novel binary to decimal conversion mechanism wherein the conversion time is unrelated to the value of the decimal digits.

Another object of the invention is to provide a novel method of obtaining the desired coded decimal digits from the multiplication mechanism.

One feature of the invention is a special means for compensating for round off errors during the conversion process.

A further feature relates to the novel organization arrangement, and relative location and interconnection of parts which provide an improved binary to coded decimal conversion system.

Other features and advantages not specifically enumerated will appear from the ensuing descriptions and the appended claims.

Inasmuch as the invention is concerned primarily with the arithmetic operations of division and multiplication to achieve binary to coded decimal conversion, only those portions of a computer system that are required for an understanding of the inventive concepts will be disclosed herein.

Figures 1, 2:
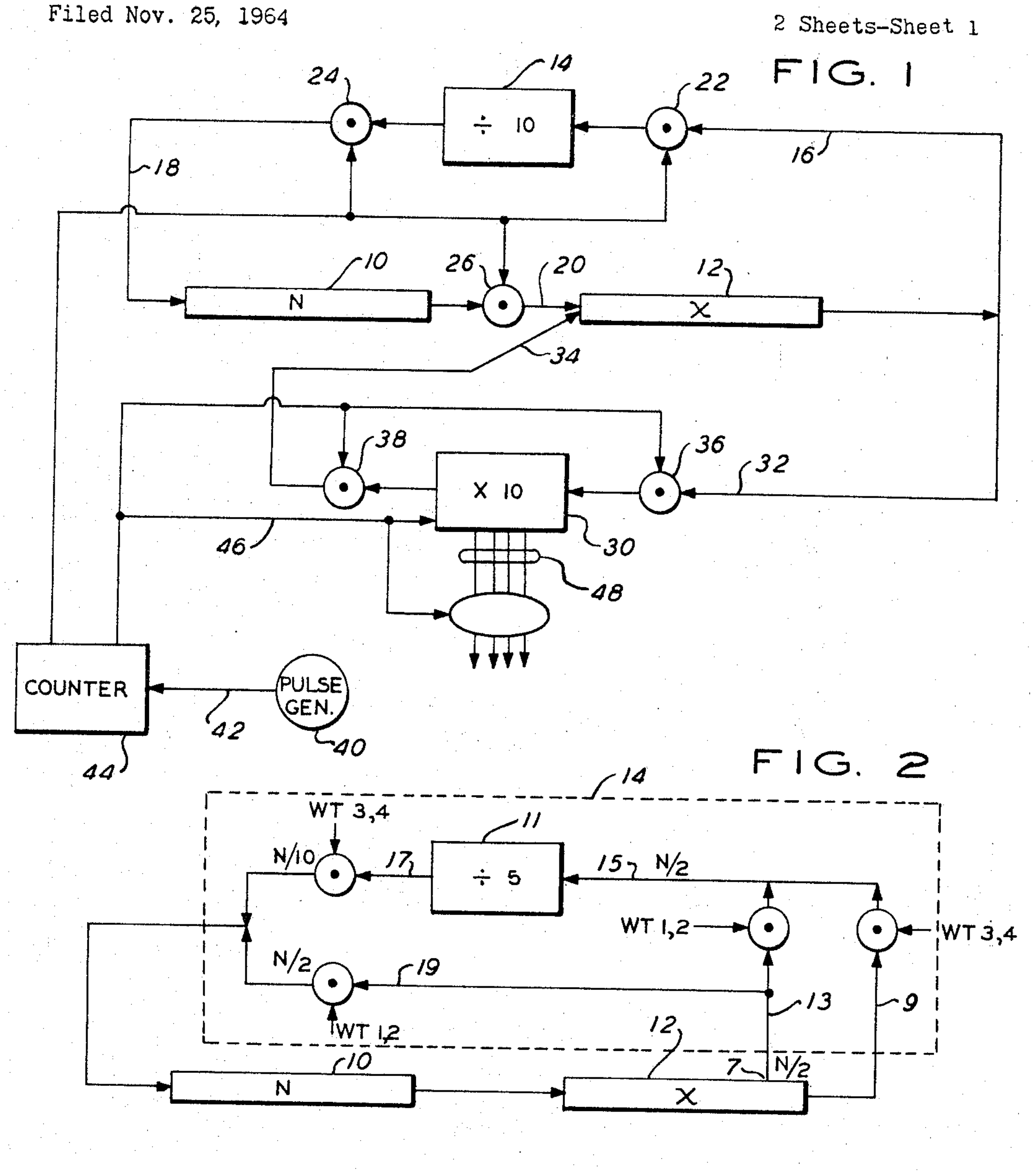
FIG. 1 is a schematic block diagram of a preferred embodiment of the invention.
FIG. 2 is a schematic block diagram showing in more detail the division by 10 mechanism.

Referring to FIG. 1, register 10 is a serial binary register of any known type with the ability of storing an $n$ bit binary number N. Register 12 is a second serial binary register of any known type capable of storing a binary number X. This register may be of any length but in the preferred embodiment its length is equal to that of the first register 10 or $n$ bits. Element 14 represents a special circuit the purpose of which is to produce at its output a binary number equal to one-tenth of the binary number appearing at its input. The details of element 14 will be described subsequently. Registers 10, 12, and element 14 are connected together via connecting paths 16, 18, and 20, and control gates 22, 24, and 26.

Block 30 represents a multiply by 10 circuit which produces at its output a binary number equal to 10 times the binary number appearing at its input. This circuit will also be described in more detail subsequently. Block 30 may also be connected to register 12 via connecting paths 32 and 34, and gates 36 and 38. Circular block 40 represents a pulse generator which generates a 1 bit time pulse every $n$ bit times. The output of the pulse generator 40 is connected by path 42 to a counter 44. The counter 44 is constructed in such a way that it can control the number of times registers 10 and 12 are connected to the divide by 10 circuit (element 14) and also the number of times that register 12 is connected to the multiply by 10 circuit (block 30). Finally, the counter 44 controls the action of the multiply by 10 circuit (block 30) via path 46 and the four signal lines 48 which emanate from the multiply by 10 circuit (block 30).

The operation of the invention, still referring to FIG. 1 is as follows:

The binary number N which is to be converted is stored in register 10. Next, a high order 1 is placed in register 12.

The binary point is assumed to lie between registers 10 and 12 so that the number in register 10 represents an integer and the number in register 12 represents a fraction. The high order 1 placed in register 12 therefore represents ½. The reason for the placement of ½ in register 12 will be explained in more detail subsequently but basically it is to compensate for round off errors in division. The two registers are then connected to element 14 via connecting paths 16, 18, and 20, and the contents of the two registers are shifted through the divide by 10 circuit (element 10) a plurality of times controlled by the counter 44. The net result of each shift of the numbers through the divide by 10 circuit is to divide $N+X$ by 10, X in this case initially being ½. This operation is repeated either until the contents of register 10 are reduced to zero or until the counter 44 reaches a preset count. The preset count represents a preferred embodiment and in that case it is the maxium number of decimal digits K which could be contained by any binary number in register 10. Thus, after K shifts of the numbers through the divide by 10 circuit the contents of register 10 will be zero and the contents of register 12 will be equal to $$\frac{N+X}{10^k}$$

At this point, register 12 is connected to the multiply by 10 circuit 30 via connecting paths 32 and 34 and the contents of register 12 are shifted K times through the multiply by 10 circuit and recorded back into register 12. After each such shift through the multiply by 10 circuit, that portion of the contents of register 12 which when multiplied by 10 exceeds the capacity of said register, will be available from the multiply by 10 circuit on output lines 48. Each such overflow represents a converted coded decimal digit that was in the binary number initially stored in register 10.

A further and similar explanation of the operation of the invention is as follows. The binary number to be converted is placed in the left or high order register 10. A binary 1 is placed in the high order position of the right or lower register 12 and the rest of the right register is filled with zeroes. The two registers are now treated as a single double length register. The contents of the left register represents an integer and the contents of the right register represents a fraction. The number introduced into the right register at the beginning of the process represents the value of ½ and is here for the purpose of compensating for the round off errors which occur in the subsequent steps of the process. This procedure of adding ½ while rounding is well known to one skilled in the art. After the number is placed in the left register and the round off constant in the right register, the contents of the two registers are repeatedly divided by 10. The number of divisions by 10 is counted by a counter 44 which is designed to stop the division process after a predetermined number of divisions by 10 have taken place. The predetermined count must be equal or greater than the number of decimal digits contained in the binary number N placed in register 10 and in the preferred embodiment the predetermined count is equal to the number of decimal digits in the largest binary number which can be placed in register 10. After this predetermined count has been reached the division process stops and the contents of the left register 10 will be equal to zero and the contents of the right register 12 will be a fraction nearly equal to the original number N divided by $10^k$ where K is the predetermined count. Next, the contents of the right register are multiplied by 10 as many times as the division by 10 had been performed or in other words K times. After each multiplication the overflow from the register 12 represents a decimal digit of the answer. The exact method by which the overflow is obtained from the multiply by 10 circuit will be shown in more detail subsequently. The first decimal digit to be obtained will be the highest order decimal digit of the number and the last digit or $K^{th}$ digit will be the lowest order decimal digit of the number N.

An alternate method is to connect the output of the multiply by 10 circuit 30 to the input to register 10 instead of to the input to register 12 as is now shown in FIG. 1. The process proceeds as before except that now after each multiplication by 10 the desired digit is contained in register 10 in an 8421 code. This digit may then be sent to some other device from register 10. The contents of register 10 are then cleared and the next multiplication takes place.

The operation of the divide by 10 circuit 14 can best be understood by referring to FIG. 2. The division by 10 of a number is accomplished by the combination of two mechanisms: division by two and division by five. Division by two is accomplished by the mechanism, well known to one skilled in the art, of connecting the input to register 10 to a tap 7 one bit from the lower end of register 12 and circulating the contents of registers 10 and 12 through the tap and connecting paths 13 and 19 to the input to register 10 for two word times.

Division by five is accomplished by a circuit 11 which is described in United States Patent No. 3,039,691 to H. M. Fleming, Jr., et al. This circuit produces at its output 17 one-fifth of the number presented to its input 15. The operation of this circuit requires that the input be presented twice. This circuit is combined with the divide by two circuit so that the contents of registers 10 and 12 are first presented to circuit 11 via path 13 and then to circuit 11 via path 9. During the first two word times 1 and 2 the number N is divided by two is recorded back into register 10 via paths 13 and 19. $N/2$ is thus available on connecting path 9 during word times 3 and 4. Therefore $N/2$ is presented twice to the divide by five circuit, first via path 13 during word times 1 and 2 and second via path 9 during word times 3 and 4. The output 17 of the divide by five circuit 11 is thus N divided by 10 which is available during word times 3 and 4 to be recorded into register 10. Therefore after four word times the contents of registers 10 and 12 have been divided by 10.

Figure 2A:
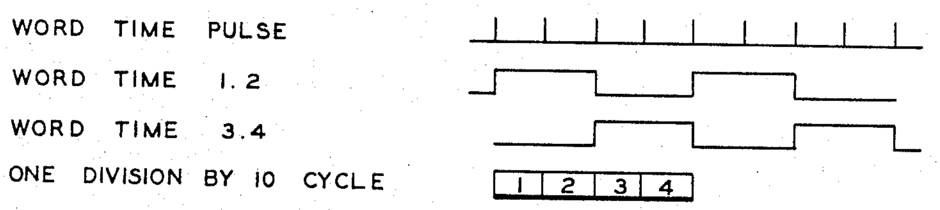
FIG. 2A is a timing diagram showing the manner of operation of the device of FIG. 2.

FIG. 2A shows the timing signals produced by timing control means (not shown) in response to the word time pulses produced by a pulse generator such as 40 in FIG. 1. The word time 1, 2 signals and the word time 3, 4 signals are applied to the various gates as shown in FIG. 2.

Thus, after K division cycles the original number N has been reduced to a binary fraction contained wholly in register 12. This fraction is now multiplied by 10 K times by circuit 30 which can best be understood by referring to FIG. 3. Circuit 30 consists of 3 delay flip-flops 31, 33, and 35, a sum net 39 and a carry flip-flop 37. To understand the operation of circuit 30 let the input 32 to the circuit be A. Then the output of flip-flop 31 is 2A and the output of 35 is 8A. These two signals 2A and 8A are applied to the sum net 39 and the output is 10A which appears on connecting path 34. Thus after one word time the contents of register 12 have been multiplied by 10. Multiplication by 10 of the number which is in register 12 may produce a new number which is too large to be contained in register 12. This overflow will then be found in flip-flops 31, 33, 35, and 37 at the completion of the multiplication by 10 or, in other words after one word time. The number in these flip-flops represents a desired decimal digit and is available on output lines 48 in a 5211 code. After the desired decimal digit is read out of the flip-flops 31, 33, 35, and 37, the flip-flops are reset to zero and the process continues with the next multiplication by 10. Therefore each multiplication by 10 will produce one decimal digit on the wires 48 and after K multiplications by 10, K decimal digits will be produced on wires 48. This circuit is described in greater detail in copending application Ser. No. 312,911, filed Oct. 1, 1963, entitled "Calculator" by H. M. Rathbun and M. Pivovonsky, assigned to the assignee of the instant invention.

Figures 3, 3A, 4, 5:
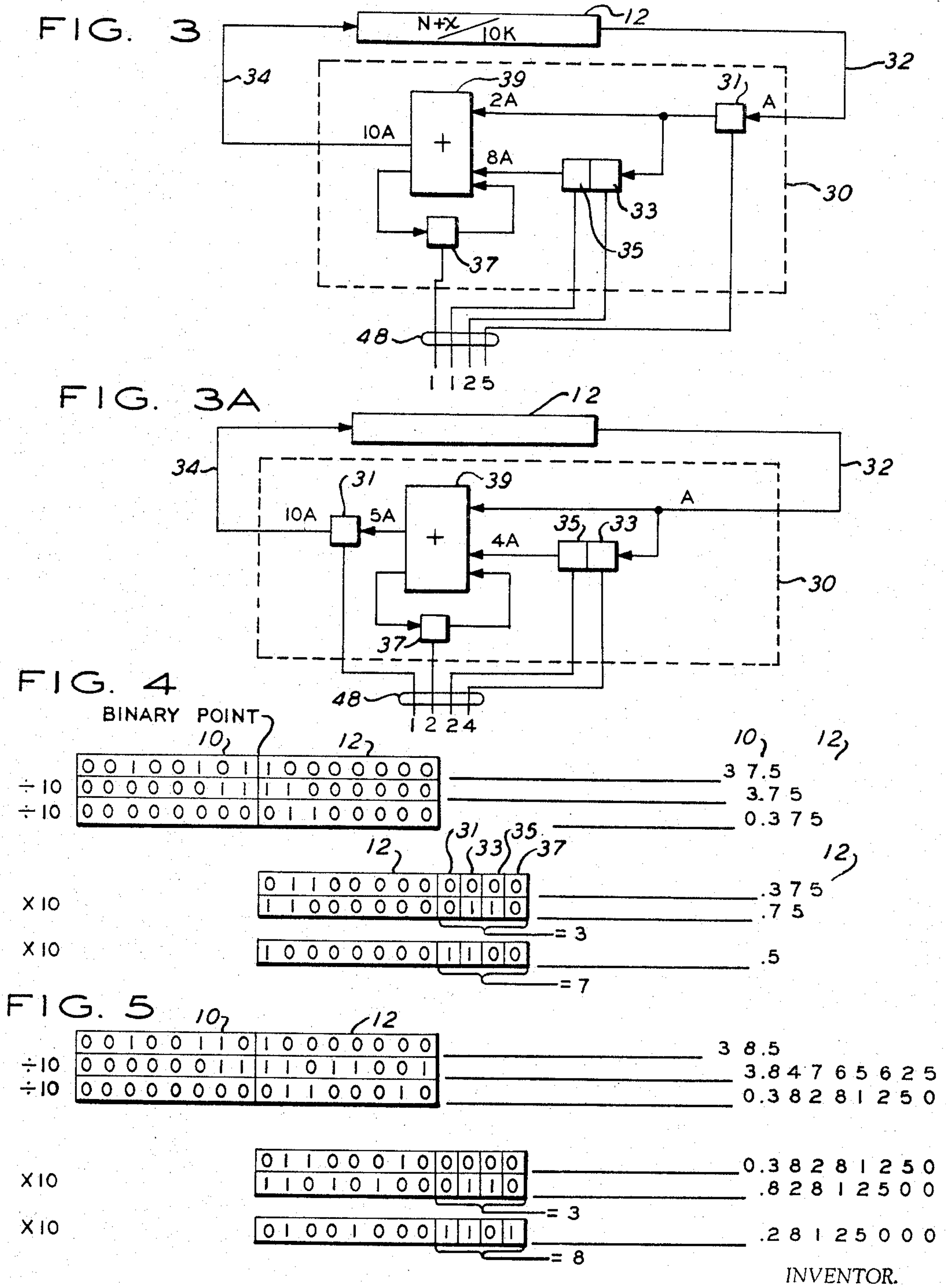
FIG. 3 is a schematic block diagram showing in more detail the multiplication by 10 mechanism.
FIG. 3A is a schematic block diagram of a modified configuration of the multiplication by 10 mechanism.
FIGS. 4 and 5 show typical examples illustrating the invention.

An alternate arrangement of circuit 30 is shown in FIG. 3A. In this case flip-flop 31 is placed in the connecting path 34 instead of path 32 as shown in FIG. 3. The operation of the circuit is essentially the same except that the decimal digits are now produced in a 4221 code.

The operation of the invention can further be understood by an examination of an example illustrated in FIG. 4. For purposes of illustration, registers 10 and 12 are each assumed to be 8 bits long. The number N to be converted is assumed to be 37 and the binary equivalent of 37 is shown initially in register 10. One-half is initially shown in register 12. After one division by 10, register 10 is seen to contain 3 and register 12 is seen to contain .75. After the second and last division by 10, register 10 is seen to contain zero and register 12 is seen to contain .375. The fourth line of FIG. 4 shows the contents of register 12 after 2 divisions by 10 and the contents of 4 flip-flops 31, 33, 35, and 37. These are the 4 flip-flops which are a part of the multiply by 10 circuit 30 and which will contain the overflow bits after each multiplication by 10. After one multiplication by 10 register 12 is seen to contain .75 and flip-flops 33 and 35 are both set indicating the presence of the 3 in the 5211 code. At this point, the contents of the 4 flip-flops may be read out to an external device. They are then reset to zero before the next multiplication by 10. After the next multiplication by 10 the contents of register 12 are seen to contain ½ or .5 and flip-flops 31 and 33 are both set indicating the presence of a 7, the second and last converted decimal digit. Thus the binary number 00100101 was converted to two decimal digits, 3 and 7, after two divisions by 10 and two multiplications by 10. Since each division by 10 requires four word times and each multiplication by 10 requires one word time the total time required was ten word times or five word times per decimal digit. In this particular example the ½ which was initially stored in register 12 is returned to register 12 after the completion of the operation, but this is not always so as can be seen from the following example shown in FIG. 5. In this case the number to be converted is 00100110 or 38. After one division by 10 the contents of register 10 represents 3 and the contents of register 12 does not represent .85 but .84765625. The reason for this is that .85 when expressed as a binary fraction is a nonterminating fraction and when that fraction is terminated after 8 bits as shown in the example the result is not equal to .85 but in this case .847655625. This difference of .00234375 is equal to that portion of the fraction which was lost. This is analogous to expressing a fraction such as ⅓ in the decimal system using only a limited number of decimal places to the right of the decimal point. The conversion proceeds as before and the digits 3 and 8 are produced in that order. At the end of operation register 12 is seen to contain the equivalent of .28125 instead of .5 as was the case in FIG. 4. The difference of .22875 represents the truncation error produced by two divisions by 10. In this example the addition of ½ to register 12 before the operation began was more than enough to compensate for the loss due to truncation error.

As was stated previously, it is not necessary that both registers 10 and 12 be of the same length but in the preferred embodiment they are the same length. Neither is it necessary to initially insert .5 into register 12 as is done in the preferred embodiment. However, register 12 must be of such a length and the initial constant must be such that the truncation error caused by K divisions by 10 will not influence the last digit of the converted number. The relationship between the number of decimal digits K to be converted, the length $n$ of register 12 and the initial constant X placed in register 12 can be developed as follows. The round off error in each division does not exceed $2^{-n}$. The cumulative round off error E for K divisions by 10 is therefore $$E \leq 2^{-n} + \frac{2^{-n}}{10} + \frac{2^{-n}}{10^2} + \cdots \frac{2^{-n}}{10^k} \quad (1)$$

$$E \leq 2^{-n}\left(1 + \frac{1}{10} + \frac{1}{10^2} + \cdots \frac{1}{10^k}\right) \quad (2)$$

$$E \leq 2^{-n}(1.1111\ldots) \quad (3)$$

$$E < \frac{10}{9} 2^{-n} \quad (4)$$

This error is multiplied 10 K times in the remaining steps of the process and can become as large as $$10^k E < \frac{10}{9} 2^{-n} 10^k \quad (5)$$

Now after K divisions by 10 and K multiplications by 10 the right register 12 will contain $$X - 10^k E \quad (6)$$

where $10^k$E represents the cumulative truncation error. Now the above expression must be equal to or greater than zero in order that the truncation error E does not affect one or more digits of the number N. Therefore from Equation 5 above which gives the maximum truncation error in E we have $$X \geq 10^k E \quad (7)$$

$$X \geq \frac{10}{9} 2^{-n} 10^k \quad (8)$$

Equation 8 gives the minimum value of the initial constant X which must be used for any register length $n$ and number of converted digits K. Equation 8 also gives the following expression.

$$10^k \leq \frac{9}{10} 2^n X \quad (9)$$

which gives the maximum value of K for any X and any $n$.

For the example shown in FIG. 4, where $K=2$, $n=8$ and $X=½$, Equation 9 then gives $$10^2 \leq \frac{9}{10} 2^8 \tfrac{1}{2}$$

$$\leq \frac{9}{10} 2^7$$

$$100 \leq 115.2$$

This shows that two decimal digit numbers can be converted using an 8 bit register 12 and an initial constant X of ½. Conversely Equation 8 can also give for the above example the minimum value of the initial constant for converting 2-decimal digit numbers with an 8 bit register.

$$X \geq \frac{10}{9} \frac{10^2}{28}$$

$$X \geq .434027777\ldots$$

or in binary notation $$X \geq .011100000$$

It is apparent from the above discussion and in particular from the example shown in FIG. 4 that there is a certain class of binary numbers which may be converted to decimal digits without the use of an initial constant in register 12. This class of numbers includes all numbers which when divided by 10 K times produces as a result a binary fraction which terminates in $n$ bits. In other words, all numbers which are evenly divisible by the ratio $10^k$ divided by $2^n$ in the case of the example shown in FIG. 4, this would be all numbers which are evenly divisible by .390625.

It should be understood that this invention is not limited to the specific details of construction and arrangement thereof herein illustrated, and that changes and modifications may occur to one skilled in the art without departing from the spirit of the invention; the scope of the invention being set forth in the following claims.

What is claimed is:

1. A circuit arrangement for converting a binary number into an equivalent coded decimal number comprising storage means for storing the binary number to be converted, divide by 10 means, control means operatively connected to the divide by 10 means and storage means said control means causing the contents of the storage means to be divided by 10 by said divide by 10 means a predetermined number of times, multiplication by 10 means, connected to the said control means to cause the contents of the said storage means to be multiplied by 10 by said multiplication by 10 means the same predetermined number of times and output means connected to said multiplication means for making available one decimal digit after each multiplication by 10.

2. Apparatus for converting a binary number into an equivalent coded decimal number comprising a first storage means for storing the binary number to be converted, second storage means for storing a binary fraction, divide by 10 means, control means operatively connected to the storage and divide by 10 means said control means causing the contents of said first and second storage means to be divided by 10 by said divide by 10 means a predetermined number of times, multiplication by 10 means including four bistable elements arranged in such a manner that the output of the multiplication means is 10 times the input to the multiplication means, the said multiplication by 10 means being connected to the control means to cause the contents of said second storage means to be multiplied by 10 by said multiplication by 10 means the same predetermined number of times, and output means connected to said bistable elements for making available to an external device one decimal digit after each said multiplication by 10 wherein the decimal digit is represented in a 4 bit binary code.

3. Apparatus according to claim 2 wherein the said four bistable elements are arranged in such a manner that the decimal digits are represented in a 5211 code.

4. Apparatus according to claim 2 wherein the said four bistable elements are arranged in such a manner that the decimal digits are represented in a 4221 code.

5. Apparatus according to claim 1 wherein the plurality of divisions by 10 and the plurality of multiplications by 10 are both equal to the number of decimal digits to be converted from the stored binary number.

6. Apparatus according to claim 2 wherein the plurality of divisions by 10 and the plurality of multiplications by 10 are both equal to the number of decimal digits to be converted from the stored binary number.

7. Apparatus according to claim 1 in which the plurality of divisions by 10 and the plurality of multiplications by 10 are both equal to the maximum number of decimal digits which could be contained in any binary number initially stored in the storage means.

8. Apparatus according to claim 2 in which the plurality of divisions by 10 and the plurality of multiplications by 10 are both equal to the maximum number of decimal digits which could be contained in any binary number initially stored in the storage means.

References Cited

UNITED STATES PATENTS 2,860,831 11/1958 Hobbs -------------- 235—61
3,257,547 6/1966 Bernstein ----------- 235—155

MALCOLM A. MORRISON, *Primary Examiner.*

V. SIBER, *Examiner.*

UNITED STATES PATENT OFFICE
CERTIFICATE OF CORRECTION

Patent No. 3,373,269 March 12, 1968

Howard M. Rathbun et al.

It is certified that error appears in the above identified patent and that said Letters Patent are hereby corrected as shown below:

In the heading to the printed specification, line 6, "Delaware" should read -- New York --.

Signed and sealed this 14th day of April 1970.

(SEAL)
Attest:

Edward M. Fletcher, Jr.
Attesting Officer

WILLIAM E. SCHUYLER, JR.
Commissioner of Patents